US008030801B2

(12) United States Patent
Mann, III et al.

(10) Patent No.: US 8,030,801 B2
(45) Date of Patent: Oct. 4, 2011

(54) MULTI-VOLTAGE POWER SUPPLY FOR A UNIVERSAL AIRPLANE GROUND SUPPORT EQUIPMENT CART

(75) Inventors: James W. Mann, III, St. Petersburg, FL (US); David Wayne Leadingham, Bradenton, FL (US)

(73) Assignee: Illinois Tool Works Inc., Glenview, IL (US)

( * ) Notice: Subject to any disclaimer, the term of this patent is extended or adjusted under 35 U.S.C. 154(b) by 430 days.

(21) Appl. No.: 12/250,265

(22) Filed: Oct. 13, 2008

(65) Prior Publication Data

US 2009/0121552 A1  May 14, 2009

Related U.S. Application Data

(60) Provisional application No. 60/984,164, filed on Oct. 31, 2007, provisional application No. 61/036,722, filed on Mar. 14, 2008.

(51) Int. Cl.
*H02J 4/00* (2006.01)
(52) U.S. Cl. ............... 307/80; 307/72; 307/73; 307/75
(58) Field of Classification Search ............ 307/72–76, 307/80, 82, 84, 64–66
See application file for complete search history.

(56) References Cited

U.S. PATENT DOCUMENTS

| | | | |
|---|---|---|---|
| 3,971,976 A | | 7/1976 | Baker |
| 5,355,024 A | * | 10/1994 | Elliott et al. ............ 307/73 |
| 5,386,147 A | * | 1/1995 | Bonneau et al. ......... 307/64 |
| 5,757,633 A | * | 5/1998 | Bowles .................. 363/71 |
| 6,320,773 B1 | * | 11/2001 | Urish et al. ............. 363/92 |
| 6,424,891 B1 | | 7/2002 | Sargent et al. |

FOREIGN PATENT DOCUMENTS

| | | |
|---|---|---|
| WO | WO 2005124990 A2 * | 12/2005 |
| WO | 2007061622 A1 | 5/2007 |

OTHER PUBLICATIONS

PCT/US2008/081091—International Search Report. dated Mar. 17, 2009.
PCT/US2008/081091—Written Opinion of the International Searching Authority. dated Mar. 17, 2009.
PCT/US2008/081091—Notification of Transmittal of the International Search Report and the Written Opinion of the International Searching Authority or the Declaration. Mar. 17, 2009.

* cited by examiner

*Primary Examiner* — Fritz M Fleming
(74) *Attorney, Agent, or Firm* — Perry Hoffman

(57) ABSTRACT

An airplane ground support system includes a multi-voltage power supply. This system includes an air conditioning module and a control module having a display and a processor, the display and processor presenting an airplane type or class selection menu to airplane support technicians and responding to the selection of a type or class of airplane by generating a power output selection signal designating the type of power needed by the selected type or class of airplane. The system also includes a power supply module which has an A.C. power input, at least one power output, and which receives the power output selection signal as an incoming signal. A power conversion system within the power supply module connects to the A.C. power input and supplies converted and voltage regulated power to the at least one power output. This power conversion system also receives the power conversion control signal as an input signal. A control system within the power conversion module receives measurements of the voltage at the power supply module's at least one power output and also receives the control module's power output selection signal. This control system generates the power conversion system's power conversion control signal and adjusts it to regulate the power module's output to a predetermined preset voltage level as mandated by the power output selection signal.

20 Claims, 8 Drawing Sheets

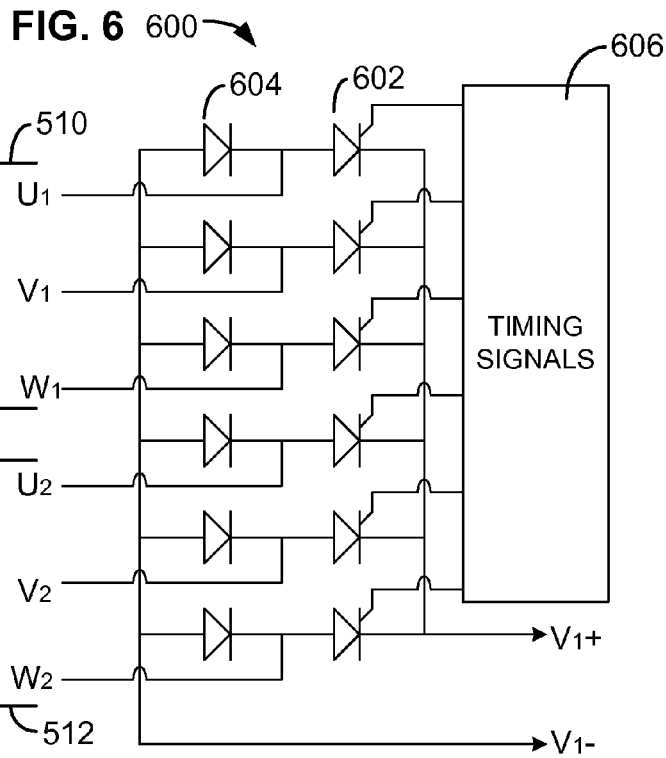
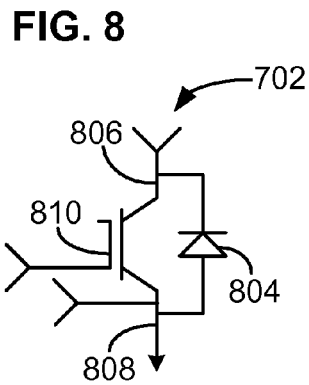
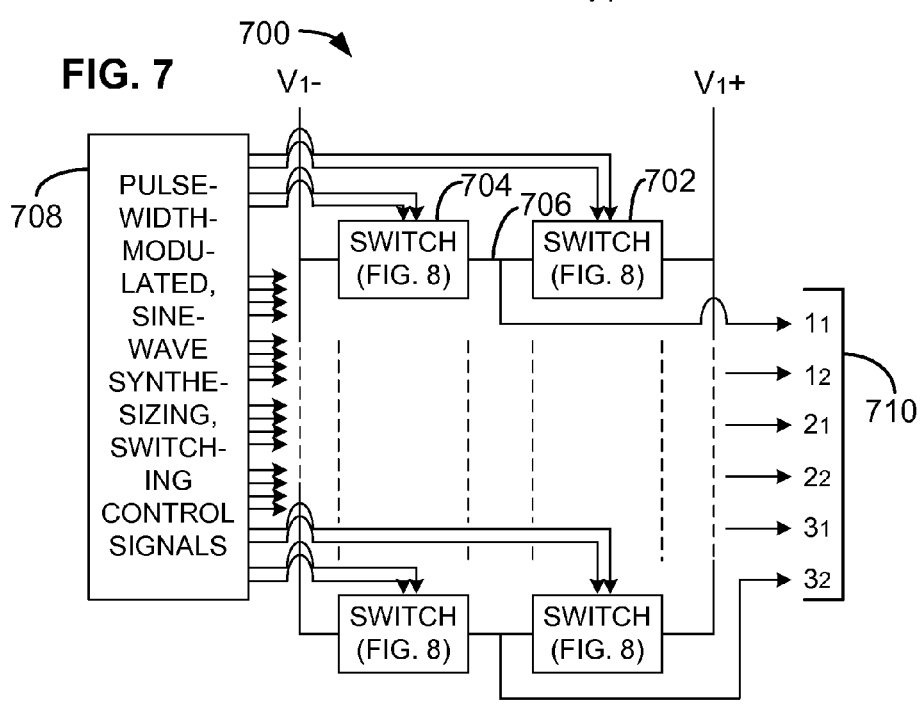

ion Ser. No. 60/984,164 filed Oct. 31, 2007 and provisional
MULTI-VOLTAGE POWER SUPPLY FOR A UNIVERSAL AIRPLANE GROUND SUPPORT EQUIPMENT CART This application is a non provisional of provisional application Ser. No. 60/984,164 filed Oct. 31, 2007 and provisional application Ser. No. 61/036,722 filed Mar. 14, 2008.

CROSS-REFERENCE TO RELATED APPLICATIONS

The present patent application is one of a set of commonly owned applications filed on the same day as the present application, sharing some inventors in common, and relating to airplane ground support equipment and carts. The other applications in this set, listed here, are hereby incorporated by reference into the present application: "An Adjustable Cooling System for Airplane Electronics," Jeffrey E. Montminy and Steven E. Bivens (US 2009/0107657 A1); "A Frame and Panel System for Constructing Modules to be Installed on an Airplane Ground Support Equipment Cart," Jeffrey E. Montminy, Brian A. Teeters, and Kyta Insixiengmay (US 2009/0108549 A1); "A System of Fasteners for Attaching Panels onto Modules that are to be Installed on an Airplane Ground Support Equipment Cart," Jeffrey E. Montminy, Brian A. Teeters, and Kyta Insixiengmay (US 2009/0110471 A1); "Airplane Ground Support Equipment Cart Having Extractable Modules and a Generator Module that is Separable from Power and Air Conditioning Modules," James W. Mann, III and Jeffrey E. Montminy (US 2009/0108552 A1); "An Adjustable Air Conditioning Control System for a Universal Airplane Ground Support Equipment Cart," James W. Mann, III, Jeffrey E. Montminy, Benjamin E. Newell, and Ty A. Newell (US 2009/0107159 A1); "A Compact, Modularized Air Conditioning System that can be Mounted Upon an Airplane Ground Support Equipment Cart," Jeffrey E. Montminy, Kyta Insixiengmay, James W. Mann, III, Benjamin E. Newell, and Ty A. Newell (US 2009/0107160 A1); and "Maintenance and Control System for Ground Support Equipment," James W. Mann, III, Jeffrey E. Montminy, Steven E. Bivens, and David Wayne Leadingham (US 2009/0112368 A1).

BACKGROUND OF THE INVENTION

1. Field of the Invention

The present invention relates generally to the field of power supplies and more specifically to multi-voltage power supplies suitable for use in a universal airplane ground support equipment cart.

2. Description of the Related Art

When an airplane is on the ground with its engines shut down, the airplane is typically unable to provide power for its electrical systems and chilled air for its air conditioning systems; and some airplanes are also unable to provide liquid coolant for some critical electronic (or "avionic") components. It is customary to connect such a grounded airplane to an airplane ground support equipment system. Such a system may have its components mounted upon a mobile equipment cart that is called an airplane ground support equipment cart and that may be parked, placed, or mounted conveniently close to an airplane requiring ground support. Such a cart typically contains an air conditioner that can provide conditioned and cooled air to an airplane plus an electrical power converter that can transform power drawn from the local power grid into power of the proper voltage (AC or DC) and frequency required by the airplane. Such an airplane ground support equipment cart may also contain a diesel engine connected to an electrical generator that enables the cart to provide both air conditioning and also electrical power for an airplane without any connection to the local power grid. And if an airplane requires a source of cooled liquid for its electronics, some carts may also include a source of liquid coolant, typically a polyalphaolefin, or PAO, heat transport fluid or liquid coolant.

In the past, particularly with regard to military airplanes, such ground support equipment carts have been custom designed to meet the specialized needs of a single particular type or class of airplane. Hence, a cart designed to support the specific requirements and needs of a first type or class of airplane cannot be used to support the differing specific requirements and needs of other types or classes of airplanes. Different airplanes typically may require different pressures and volumes of cooled air, different amounts of electrical power, different electrical voltage levels, and different electrical frequencies (or direct current). And different airplanes typically may require differing pressures and volumes of cooled liquid for use in cooling onboard electronics. Accordingly, every airport must be supplied with as many different types of ground support equipment carts as there are different types or classes of airplanes that may land and take off at each airport or military base. Problems arise when more airplanes of a particular type arrive at a specific location than there are ground support equipment carts suitably designed to service the needs of that particular type or class of airplane.

To be more specific, some airplanes require their ground support equipment to provide considerably more airflow at higher pressures than do other airplanes having smaller interiors. Some airplanes require their electrical power to be adjusted to 115 volts of alternating current (A.C.) which alternates, or flows back and forth, 400 times each second (115 volts, 400 Hz A.C.). Other airplanes require 270 volts direct current (270 volts, D.C.) that does not flow back and forth. Yet other airplanes require a source of 28 volts of direct current (28 volts, D.C.). And airplanes also differ in the amount of electrical power that they draw.

As an example of an airplane cart arrangement that provides air conditioning and electrical power conversion for an airplane, PCT patent application No. PCT/US2006/043312 (Intl. Pub. No. WO 2007/061622 A1 published on May 31, 2007) discloses an airplane ground support cart that has a modular design of its electrical conversion components. This cart provides air conditioning and electrical power conversion as well as optional electrical power generation services to airplanes. FIG. 5 reveals that the cart disclosed in this patent application may receive interchangeable, modular power conversion modules. Thus, a module 72, which generates 3-phase 115 volt 400 Hz A.C. power, may be removed and replaced with a module 78, which generates 270 volt D.C. power. FIG. 6 illustrates that this cart may also accept a module 92, which generates 28 volt D.C. electrical power.

FIG. 2 of the above PCT patent application illustrates a typical arrangement of the mechanical components of a dual air conditioning system within an airplane ground support equipment cart 14. The air conditioner's mechanical components are spread all across the entire length of the cart 14. Two sets of condenser coils 34 are positioned at one end of the cart 14; and the thickness of the coils 34 and their housing, together with the thickness of the associated cooling fans, occupies roughly one-fifth of the cart's overall length. A filter and upstream evaporation coil 30 and a downstream evaporation coil 40 and outlet connection 42 (to which can be attached a duct leading to an airplane) are positioned at the other extreme end of the cart 14, occupying somewhat less than one-fifth of the cart's overall length. A blower fan 32, a discharge plenum 38, and two compressors 36 are shown positioned in the central portions of the cart 14. These mechanical components of the air conditioning system are not confined within a rectangular module within a portion of the volume of the cart 14—these components are spread all across the cart 14 and thus cannot be conveniently removed from the cart for servicing or for use away from the cart 14. Other cart components, such as a diesel engine 54 and generator 56 (shown in FIG. 4 of the PCT application) and an electrical power converter unit 72 (shown in FIG. 5 of the PCT application) are squeezed in among the air conditioning components wherever there is room. This intermixing of non-air-conditioning components with the air-conditioning components greatly complicates servicing of all the components, since they are all crowded into the same cramped space. A service man working on the air conditioner compressors or blowers may find the diesel engine 54 and the generator 56 are in the way of these components, for example.

The air conditioning systems of such a conventional ground support equipment system is also designed to provide a particular volume of cooled air at a particular temperature and pressure to a particular type or class of airplane. If such a system has its cool air ducted into some other type or class of airplane, too much or too little air will flow from the air conditioner system, and this will throw off the balance of the air conditioning system, causing the air to be cooled too little or too much and possibly causing icing of the internal evaporators or damage to the airplane. And the temperature and pressure provided may not be proper for some other type or class of airplane. Likewise, the electrical systems may not be able to supply the needs of differing types or classes of airplanes, and the PAO liquid cooling system may not be properly balanced when used to cool the avionics of differing types or classes of airplanes.

SUMMARY OF THE INVENTION

An embodiment of the invention relates to a multi-voltage A.C. and D.C. power supply. A power supply module has an A.C. power input, at least one A.C. and one D.C. power output, and an incoming power output selection signal. This module contains a sine wave synthesizer which has a D.C. power input and a synthesized A.C. power output which connects to the module's A.C. power output, and which synthesizer also has as an input receiving one or more sine wave synthesizing control signals. A first rectifier connects the module's A.C. power input to the synthesizer's D.C. power input, and a second rectifier connects the synthesizer's A.C. power output to the module's D.C. power output. A control system receives measurements of voltages at the module's A.C. and D.C. power outputs and also receives the module's A.C. or D.C. power output selection signal. This control system generates the sine wave synthesizing control signals and adjusts them to regulate whichever output signal, A.C. or D.C., is selected by the selection signals so that selected output signal is maintained at a predetermined A.C. or D.C. preset voltage level.

In another embodiment, the present invention is an airplane ground support system that includes a multi-voltage power supply. This system includes an air conditioning module and a control module having a display and a processor, the display and processor presenting an airplane type or class selection menu to airplane support technicians and responding to the selection of a type or class of airplane by generating a power output selection signal designating the type of power needed by the selected type or class of airplane. The system also includes a power supply module which has an A.C. power input, at least one power output, and which receives the power output selection signal as an incoming signal. A power conversion system within the power supply module is connected to the A.C. power input and supplies converted and voltage regulated power to the at least one power output. This power conversion system also receives the power conversion control signal as an input signal. A control system within the power conversion module receives measurements of the voltage at the power supply module's at least one power output and also receives the control module's power output selection signal. This control system generates the power conversion system's power conversion control signal and adjusts it to regulate the power module's output to a predetermined preset voltage level as mandated by the power output selection signal.

BRIEF DESCRIPTION OF THE DRAWINGS

FIG. 6 is a circuit diagram of one embodiment of a rectifier used in FIG. 4.

FIG. 7 is a circuit diagram of one embodiment of a switching 400-Hz sine wave synthesizer used in FIG. 4.

FIG. 8 is a circuit diagram of one embodiment of a switch used in FIG. 7.

DETAILED DESCRIPTION OF THE INVENTION

The following detailed description includes a first part A, which describes the environment of the present invention; and a second part B, which focuses in particular on the details of an embodiment the present invention—a multi-voltage electric power conversion module.

A. Modular and Universal Airplane Ground Support Equipment Cart

Airplane ground support equipment carts are wheeled, towable carts or fixed mounted (permanently or temporarily) devices that provide air conditioning, avionics equipment liquid cooling, and electrical power conversion and generation services to airplanes whose engines are shut down. These carts preferably should be conveyed by military and other airplanes to airports and military bases all over the world, so it would be convenient and an advantage to have this equipment be no larger than a standard military equipment conveyance palette. However, many such carts today do not fit one standard palette, and this reduces the numbers of ground support equipment that is available in the field. Traditionally, such ground support equipment carts are custom-designed—they provide such services to only one type or class of airplane. Hence, different carts must be provided for each different type of airplane. Also traditionally, the air conditioning components mounted on such carts are so bulky that they occupy the entire area of the cart, making it necessary to sandwich electrical power conversion and other components wherever there is room and thereby making it extremely awkward to service or replace such cart-mounted components.

Figure 1:
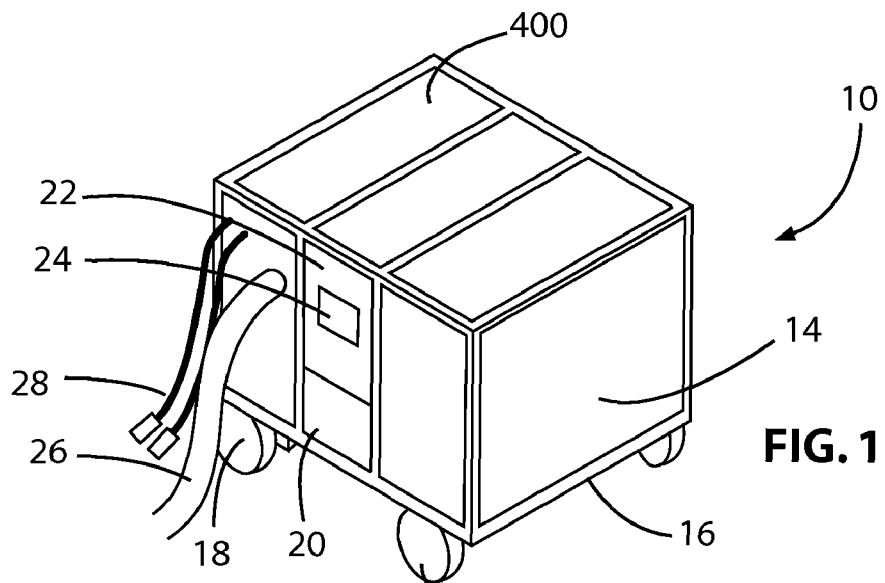
FIG. 1 is an isometric view of an airplane ground support equipment cart containing a power conversion module designed in accordance with the present invention.

The present invention is embodied in a universal airplane ground support equipment cart—universal in the sense that it is designed to service the varied needs of a variety of types and classes of airplanes, rather than just one type or class. This ground support equipment cart is also modular—its components are rectangular modules that may be easily separated or removed from the cart for service or exchange. The modules may also be used independently of the cart, and modules not needed for a particular type of airplane may be readily removed and used elsewhere, standing by themselves, in a highly flexible manner. Such a cart 10 and several of its modules—an electrical power generation module 14, an electrical power conversion module 20, and a dual air conditioning module 400 (which also provides PAO liquid cooling)—are illustrated in simplified form in FIGS. 1-3. (Much more detailed drawings of these components are included in this application and also in the related applications cited above).

In use, the cart 10 is mounted near or drawn up to an airplane (not shown) by a suitable tractor or truck (not shown). An operator connects an air conditioning plenum or air duct 26 from the dual air conditioning module 400 to a cooled air input port (not shown) on the airplane. And if the airplane has avionics or other electronic components that require a supply of liquid coolant, then the operator also connects a pair of PAO liquid coolant conduits 28 from the air conditioning module 400 to a pair of PAO ports on the airplane. The operator then uses a suitable electrical power cable (not shown) to connect an electrical power output port or receptacle (not shown in FIGS. 1-3) on the electrical power conversion module 20 to a matching port or cable on the airplane. To supply the varying needs of different types of airplanes, there may be as many as two electrical power conversion modules 20 the cart 10, a first module 20 having both a 115 volt, 400 Hz AC power output port and also a separate 270 volt DC power output port, and a second module 1208 (FIG. 12) having a 28 volt DC power output port (one or the other of these modules 20 or 1208 may be removed from the cart 10).

Figure 12:
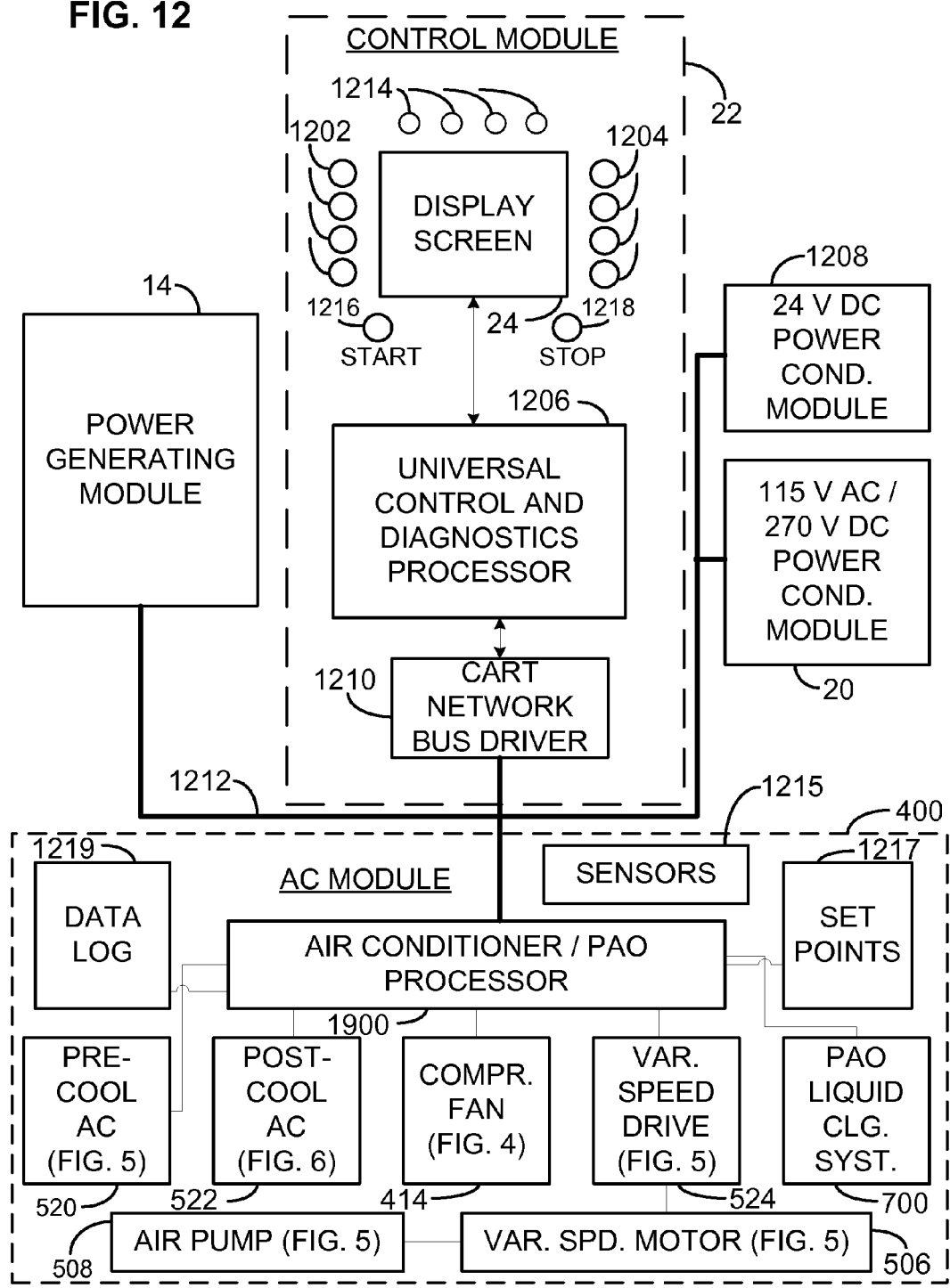
FIG. 12 is a block diagram of the networking together of the various modules within the cart and the cart control module.
Figure 13:
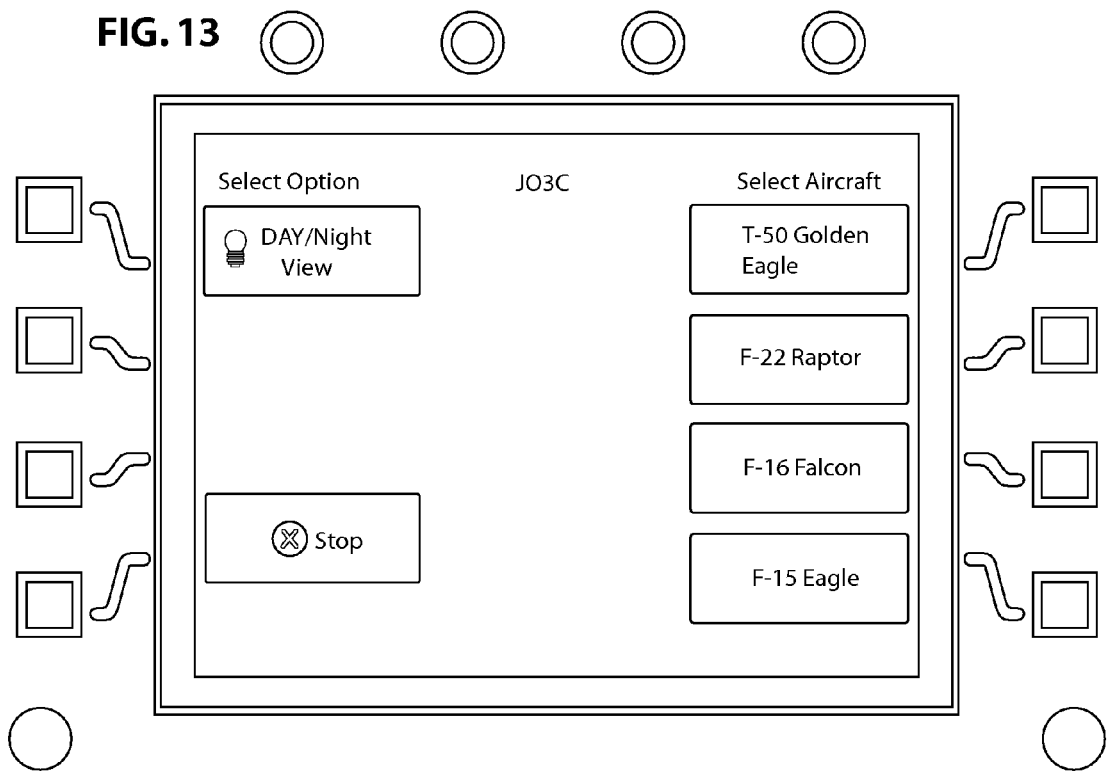
FIG. 13 is an illustration of a main menu that is shown on the display screen and that permits selection of the type or class of airplane that is to be serviced.
Figure 14:
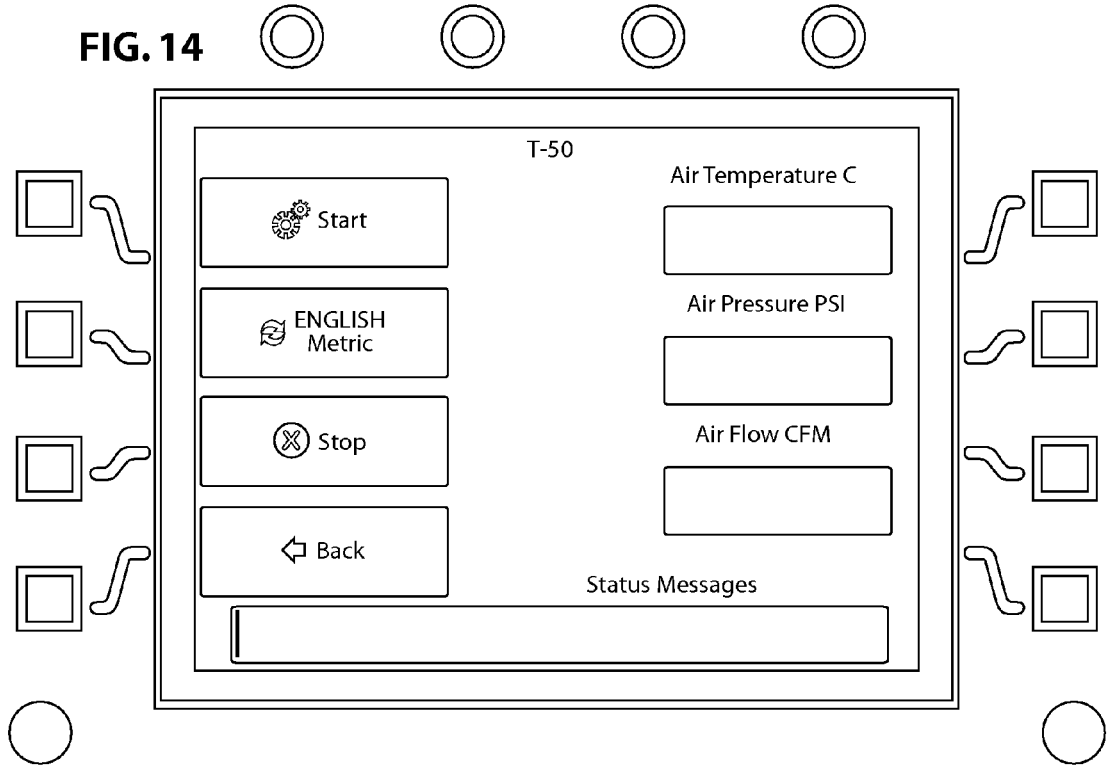
FIG. 14 is an illustration of the maintenance menu that can be displayed on the display screen.

Next, with reference to FIG. 12, the operator depresses a "Start" pushbutton 1216 on the front panel of a control module 22 having a display screen 24 that then displays a main menu such as that shown in FIG. 13. If the airplane is a T-50 Golden Eagle, the operator depresses one of four pushbuttons 1204 that is adjacent the label "T-50 Golden Eagle" on this menu (FIG. 13), and then the operator depresses one of four pushbuttons 1202 that is adjacent the label "Start" on a "T-50" menu that then appears (FIG. 14). In response, all of the modules automatically reconfigure themselves as needed to service this specific type of airplane with air conditioning of the proper pressure and volume of air, with electrical power of the proper type, voltage, and frequency, and with liquid coolant (if needed). If the operator selects the wrong type of airplane, pressure and air flow measurements can detect this and shut down the system, illuminating a colored status light 1214 to signal an error and displaying an appropriate error message on the control panel 24 to the operator. The system is halted when the operator depresses a "Stop" pushbutton 1218 on the front of the control 22 or a pushbutton 1202 or 1204 that is adjacent the label "Stop" on one of the display screen 24 menus (FIGS. 13 and 14).

A universal airplane ground support equipment cart is designed to provide flexible support for the needs of many different types and classes of airplanes having widely varying air conditioning and liquid cooling and electrical power support needs. The present invention can provide different pressures and volumes of cooled air and cooled liquid to different airplanes, and it can provide different types and quantities of electrical power to different airplanes. It also provides a simplified, integrated control panel where airplane service personnel can simply select the type of airplane that is to be serviced and have the various appliances on the cart automatically configured to optimize the support for that particular type of airplane.

A modular airplane ground support equipment cart is one where the different support systems provided by the cart are each confined to rugged, compact, optionally EMI shielded, rectangular modules that may be easily removed, serviced, replaced, and used stand-alone separate from the cart and its other modular components.

In the cart 10, for example, a two-stage air conditioning module 400 contains all of the air conditioning components of the cart 10, including a liquid PAO cooling system. An electrical power converter module 20 contains the power conversion components of the cart 10, including a 270 volt D.C. supply and a 115 volt 400 Hz A.C. supply; and the module 20 may be replaced or supplemented with another similar module 1208 (FIG. 12) that includes a 28 volt D.C. supply, providing up to three different types of electrical power conversion in accordance with the specialized needs of different types and classes of airplanes.

Figure 2:
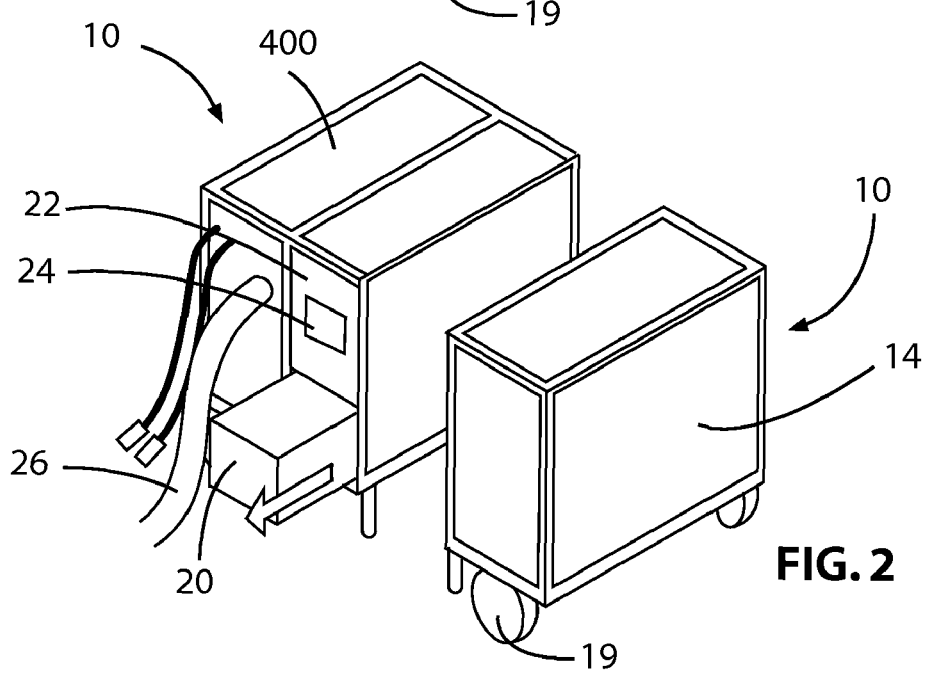
FIG. 2 is an isometric view of the cart shown in FIG. 1 with the power generation module separated from the other elements of the cart.

A power supply module 14 contains a diesel engine and a generator for producing 60 cycle, three-phase, 460 volt electrical power when the cart cannot be conveniently hooked up to a 360 to 500 volt, 50 or 60 cycle A.C., three phase supply provided by the local power grid. The power supply module 14 is confined to one end of the cart 10 and may be detached from the cart 10, as is illustrated in FIG. 2.

Any or all of these modules 14, 20, 400, and 1208 may optionally be equipped with an internal transformer (not shown) that transforms the incoming high voltage electrical power down to 120 volts or 240 volts at 50- or 60-Hz and feeds this low voltage to standard, weather protected outlets (not shown) which can be used to provide power to hand tools and to portable lighting equipment and the like, with ground fault protection also provided to these appliances.

As is illustrated in FIG. 12, a control module 22 is mounted on the cart 10 above the power converter module 20. The control module 22 has on its front panel a pair of start and stop pushbuttons 1216 and 1218, colored status lights 1214, and a display screen 24 having sets of four pushbuttons 1202 and 1204 positioned adjacent the display screen 24's left and right sides. When turned on, the display screen 24 presents a main menu display, shown in FIG. 13, which permits airplane maintenance personnel to select the type of plane that is to be serviced by depressing one of the adjacent pushbuttons 1202 and 1204. A special pushbutton depression pattern, known only to airplane service personnel, can bring up a maintenance menu display (not shown) which permits those service personnel to view and (in some cases) to alter the state of the air conditioning and PAO module 400, the electrical power converter modules 20 and 1208, and the power supply module 14. As is illustrated schematically in FIG. 12, all of the modules 14, 20, 22, 400, and 1208 are automatically networked together by a network 1212 when they are installed upon the cart 10. In addition, each of the modules 14, 20, 22, 400, and 1208 is equipped with a network jack (not shown) that can be connected to an external portable computer (not shown) which can then serve as the control module and display for all of the modules, with mouse clicks on the menus shown in FIGS. 13 and 14 replacing depressions of the pushbuttons 1202 and 1204.

Figure 3:
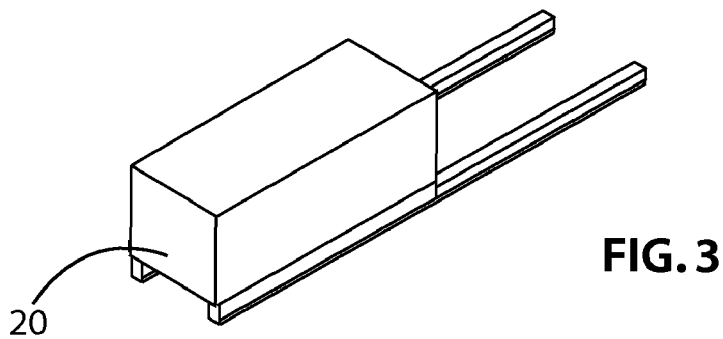
FIG. 3 is an isometric view of the power conversion module shown in FIG. 1 and FIG. 2 to illustrate how it is mounted to slide away from the cart for maintenance purposes.

The cart 10 is optionally mounted upon two wheel and axle truck assemblies 18 and 19. In the space on the cart 10 between the power generation module 14 and the two-stage air conditioning module 400, one or both of the electrical power converter modules 20 and 1208 may be slid into place and attached to the cart 10, as is illustrated in FIGS. 2 and 3. (If both are installed, they may be on opposite sides of the cart, as shown, or they may be installed one above the other.)

If the power generation module 14 is not required for a particular airplane support task, the module 14 and the wheel and axle truck assembly 19 beneath the module 14 may be completely detached from the rest of the cart 10, as is illustrated in FIG. 2, and removed to be used entirely separately elsewhere, wherever a portable source of 60 Hz, 460 volt, three-phase power is required. As illustrated in FIGS. 2 and 3, the electrical power converter modules 20 and 1208 may be slid out on tracks and locked in position to give service personnel convenient access for the servicing of these modules 20 and 1208 and their internal electrical and electronic components. They may also be removed for repair or for use elsewhere as stand-alone power converters, or they may be replaced with different power converter modules that generate different voltages and frequencies as needed for the servicing of different airplanes.

B. Description of Multi-Voltage Power Converter Module

While the present invention will be illustrated with reference to a particular power conversion module 20, having particular components, and used in a particular environment, it should be understood at the outset that the invention may also be implemented with other power supplies, components, and used in other environments.

Figure 4:
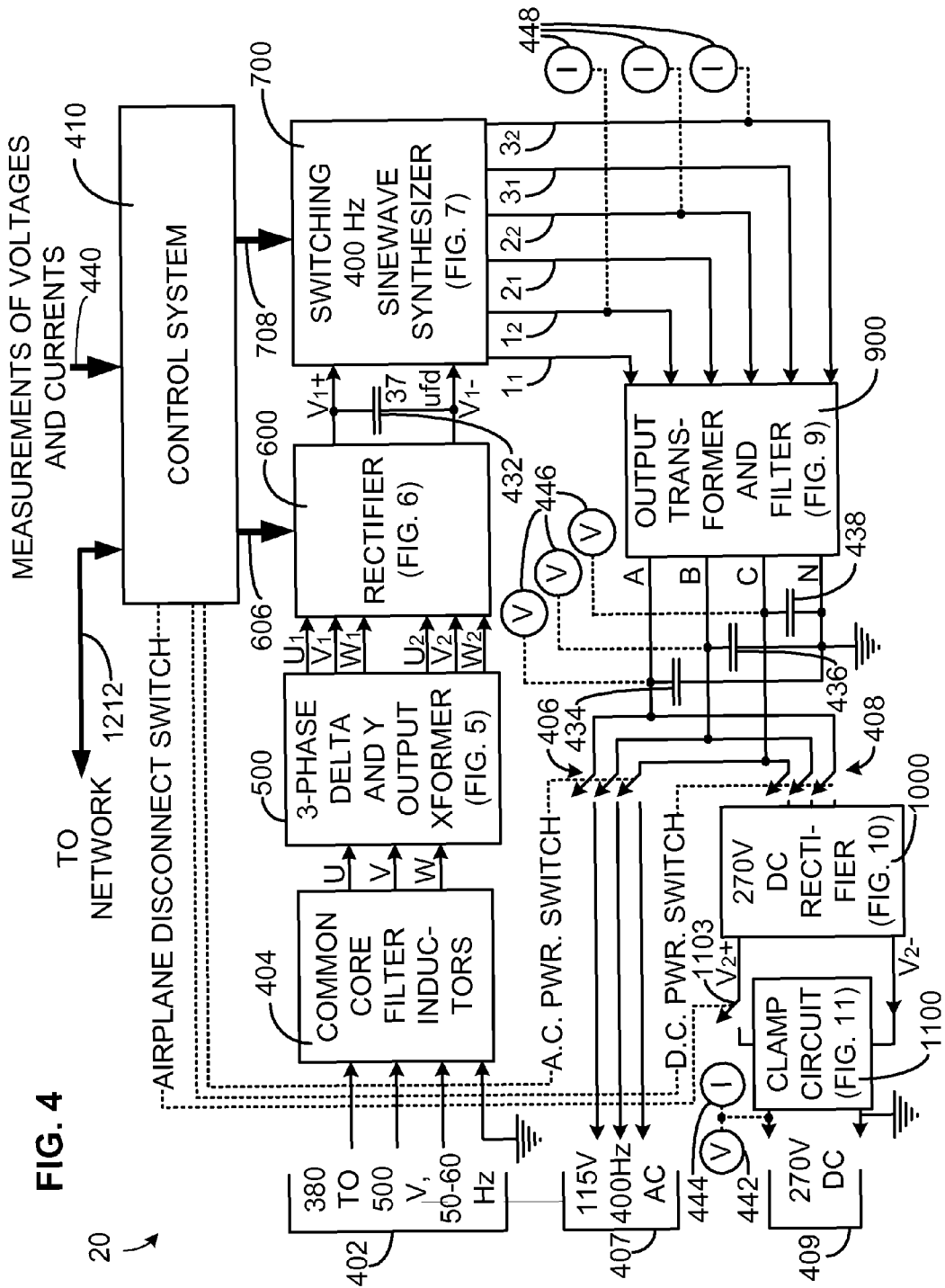
FIG. 4 is a block diagram of a multi-voltage power supply for ground support equipment as constructed in accordance with the present invention.

Referring now to FIG. 4, a multi-voltage power conversion module 20 for ground support equipment is shown. The module 20 receives multi-phase, 50-Hz to 60-Hz electrical power in the range of 380 to 500 volts (RMS) from a power input 402 and transforms it into either 115 volts, 400 Hz, A.C. electrical power or 270 volt D.C. electrical power in accordance with the electrical power requirements of the airplane being serviced. With reference to FIG. 13, the airplane service personnel select an airplane by touching the airplane's name on a displayed menu, and the electric power converter module 20 responds by programming itself automatically to generate whichever of these two voltages that the airplane requires. A processor 1206 (FIG. 12) within a control module 22 contains a display screen 24. To select an airplane, a support technician depresses one of the pushbuttons 1204 to select an airplane type, and in response to this, the processor 1206 generates a power output selection signal that is conveyed over a bus 1212 to a control system 410 (FIG. 4) within the power conversion module 20. In response to this signal, the control system 410 sends out power conversion control signals 606, 708, (etc.) (described below) which program the remaining components 400, 500, 600, 700, 900, and 1000 shown in FIG. 4, which may be collectively referred to as a power conversion system, to generate a particular type (A.C. or D.C.) and voltage of electrical power for the type or class of airplane selected. The control system 410 also monitors (at 442 and at 446) the output A.C. or D.C. voltage and adjusts the power conversion control signals, and in particular the sine wave synthesizing control signals 708, to regulate the output voltage and to thereby maintain it at a predetermined voltage level, as mandated by the power output selection signal.

The incoming power passes from the power input 402 through a common core filter and inductor circuit 404 to a multi-phase transformer 500. The transformer 500 creates two out-of-phase sets of multi-phase power signals and feeds them to a rectifier 600. The rectifier 600 converts the multi-phase 50-Hz to 60-Hz power signals into an approximately 600 volt DC signal and presents this DC signal to a switching 400-Hz sine wave synthesizer 700.

The switching 400-Hz sine wave synthesizer 700 converts the 600 volt DC power signal into a 400-Hz 115 volt multi-phase (RMS) power signal (as is explained below, this voltage will vary from 115 volts when 270 volts of D.C. power is being generated). The 400-Hz multi-phase power signal is fed into a transformer and filter circuit 900, which filters and smoothes the 400-Hz power signal into a relatively pure sine wave signal. The smoothed 400-Hz 115 volt (RMS) multi-phase power signal is then fed to first and second output switches 406 and 408.

The first output switch 406 connects the 115 volt 400-Hz A.C. multi-phase power signals A, B, and C to the module 20's 115 volt 400 Hz A.C. power output 407. The 115 volt A.C. power signals then flow from the 115 volt 400-Hz A.C. power output 407 over suitable cables to an airplane requiring 115 volt 400 Hz A.C. power. The second output switch 408 connects that same multi-phase set of power signals to a rectifier 1000. The rectifier 1000 converts the 400-Hz 115 volts (RMS) multi-phase power signal into 270 volt DC power signals $V_2+$ and $V_2-$ that pass through an airplane disconnect switch 1103 and a clamp circuit 1100 and flow to the module 20's 270 volt D.C. power output 409. The clamp circuit 1100 protects the circuitry within the power converter module 20 from transients. The 270 volt DC power signals then flow from the 270 volt D.C. power output 409 over suitable cables to an airplane requiring 270 volt DC power.

Figure 5:
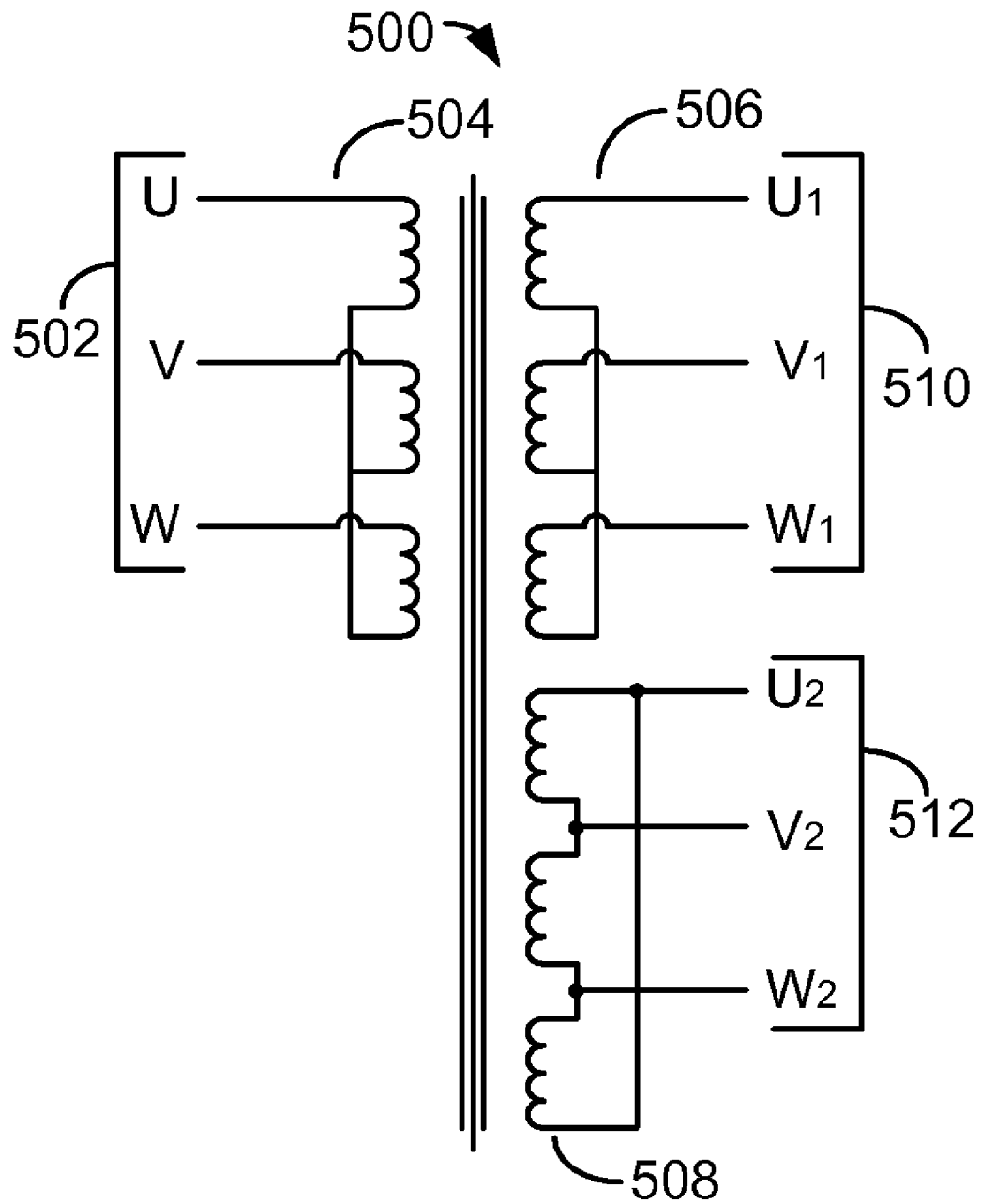
FIG. 5 is a circuit diagram of one embodiment of a transformer used in FIG. 4.

Referring now to FIG. 5, the power transformer 500 receives an input multi-phase electrical power signal 502 from the common core filter and inductor circuit 404 which was described in FIG. 4. Within the power transformer 500, the input multi-phase power signal 502 is sent through an input set of Y windings 504. The power transformer produces two multi-phase power signal outputs. A Y-connected set of secondary windings 506 produces a set of output power signals 510, and a second delta connected set of windings 508 produces a set of output power signals 512, out of phase with the signals 510. Both sets of output signals 510 and 512 are fed to a rectifier 600 as described in FIG. 6. (The transformer 500 is an ITW Military part, number TT5105.)

Referring now to FIG. 6, a rectifier circuit 600 receives the two multi-phase power signal outputs 510 and 512 from the power transformer 500. Each of the multi-phase power signals 510 and 512 is fed to a rectifying circuit comprising a diode 604 and a thyristor 602.

The rectifier circuit 600 is comprised of 6 sets each including a thyristor and a diode used in combination. Using the first thyristor and diode set as an example, this set includes the diode 604 and the thyristor 602 which together receive a power signal from the power transformer 500 described in FIG. 5. The received power signal is the signal $U_1$, one of the six signals which from the pair of multi-phase power signals 510 and 512 that flow out of the power transformer 500. The first set of multi-phase power signals 510 are represented as a multi-phase set of three AC power signals $U_1$, $V_1$, and $W_1$. The second set of multi-phase power signals 512 are represented as a multi-phase set of three AC power signals $U_2$, $V_2$, and $W_2$. As shown, the AC power signal $U_1$ is connected to the cathode of the diode 604 and to the anode of the thyristor 602 of the first thyristor and diode set. The gate of the thyristor 602 receives triggering timing signals 606 from the control system 410 which can vary the performance of the rectifier circuit 600. The cathode of the thyristor 602 is connected to the positive output terminal $V_1+$ of the rectifier circuit 600. The anode of the diodes 604 is connected to the negative output terminal $V_1-$. Each of the remaining five thyristor and diode sets is connected in the same manner to differently-phased incoming signals and to the same output signals. Timing signals 606 are used to gate the thyristors at startup. The gating of the thyristors at startup allows the input current from the power input 402 to never increase above the maximum rated current as capacitor 432 is charged from a zero potential. This provides a soft-start function which precludes an overload trip of the power source connected to the power input 402.

A filter capacitor 432, shown in FIG. 4, is connected across the rectifier circuit 600's D.C. output terminals $V_1+$ and $V_1-$. The six sets of thyristors and diodes act as A.C. voltage positive and negative peak detectors and rectifiers which fully charge this D.C. output filter capacitor 432 (shown in FIG. 1) six times during each cycle of the incoming A.C. power signal to a voltage level that approximately equals the difference between the most positive and the most negative voltage levels reached by these power signals. The six signals $U_1$, $V_1$, $W_1$, $U_2$, $V_2$, and $W_2$ each peak positively and negatively at six different times within each $50^{th}$ or $60^{th}$ of a second (depending upon the frequency of the incoming power signal). Whenever one of these six signals reaches its peak positive voltage, another one of these same six signals simultaneously reaches its peak negative voltage; and these two peaking signals work together to fully charge the filter capacitor 432. The signal peaking in the positive direction supplies current through its corresponding diode into the V+ terminal of the capacitor 432, and simultaneously the signal peaking in the negative direction draws current through its corresponding thyristor from the V− terminal of the capacitor 432, thereby fully charging the capacitor 432 to approximately the voltage level difference between the positive and negative peak signals.

The capacitor 432, a 37 microfarad, high voltage capacitor, acts as a smoothing capacitor to smooth out the resulting D.C. power signal produced by the rectifier 600. The V1+ and V1− output terminals feed this D.C. power directly into the switching 400-Hz sine wave synthesizer and filter circuit 700 which is described in FIG. 7.

Referring now to FIG. 7, the switching 400-Hz sine wave synthesizer 700 is shown. This circuit includes six pairs of switches 702 and 704 connected in series across $V_1+$ and $V_1-$ (FIGS. 1 and 6) as shown. A typical pair of switches comprises a first switch 704 and a second switch 702 which are shown in FIG. 7 connected in series. The first switch 704 connects to $V_1+$ and the second switch connects to $V_1-$. The junction 706 of the first and second switches 704 and 702 presents a power signal $1_1$ that is a pulse-width-modulated square wave that fluctuates between three states $V_1+$, $V_1-$, or 0 V. Switches 704 and 702 construct the pulse-width-modulated representation of the 400 Hz power signal at phase A of transformer 900. When the voltage at phase A of transformer 900 is positive, the power signal $1_1$ will switch between 0 V and $V_1+$, and when negative power signal $1_1$ will switch between 0V and $V_1-$. Every 83.33 μs (12 kHz) the possibility of the switch changing state exists and is based on load. Connected to both the first and second switches 702 and 704 are pulse-width-modulated switching control signals 708 that originate in the control system 410. The control system 410 generates these switching signals to cause the first and second switches 702 704 to alternate in conducting the respective V1+ and V1− power signals into the power signal $1_1$. This alternation is timed in such a manner that, after all higher harmonics above the 400 Hz fundamental have been filtered out (by the output transformer and filter 900 and the capacitors 34, 36, and 38), the signal $1_1$ becomes a sinusoid having a controlled amplitude which may be adjusted by the control system 410 to regulate the output voltage level supplied to an airplane.

A companion signal $1_2$ is generated in a similar manner, but is out of phase with the signal $1_1$. Additional pairs of signals $2_1$ and $2_2$ and also $3_1$ and $3_2$ are generated in the same manner as just described for the signals $1_1$, and $1_2$, but the signals $2_1$ and $2_2$ are 120 degrees phase shifted with respect to the signals $1_1$ and $1_2$; and the signals $3_1$ and $3_2$ are 240 degrees phase shifted with respect to the signals $1_1$ and $1_2$. Accordingly, after filtering, the signals shown at 710 become a 3-phase, 400 Hz set of power signals.

In FIG. 4, current amplitude "I" is measured in the output signals $1_2$, $2_2$, and $3_2$. These current measurements 448 are relayed to the control system 410 (measurements 440) as a measure of the current and power being drawn from the power converter module 20. Hall effect current sensors are used to measure current. These can be obtained from the LEM SA (Geneva, Switzerland) as current transducer part number LF 505-S.

Referring now to FIG. 8, a circuit diagram of the switches used in FIG. 7 is shown. The switch 702 in an IGBT transistor which, as shown, may be visualized as a power field effect transistor having a gate 810 and having incorporated into its design a diode 804 interconnecting its source 806 and drain 808. The switch 702 thus operates somewhat as a switch bypassed by a diode. The switch 702 is an integrated circuit manufactured by Eupec, Inc. (Lebanon, N.J.) with part number BSM300GB120DLC.

Figure 9:
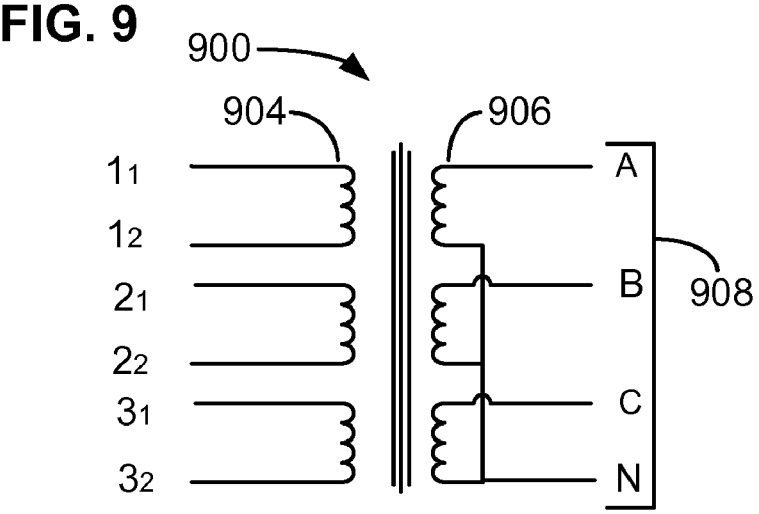
FIG. 9 is a circuit diagram of one embodiment of an output transformer and filter used in FIG. 4.

The power output signals 710 of the 400-Hz sine wave synthesizer 700 are fed through a power output transformer and filter 900 shown in FIG. 9. The pair of power output signals $1_1$ and $1_2$ are applied to a first winding of the power output transformer 900's primary windings 904. The pair of power output signals $2_1$ and $2_2$ are fed to a second winding of the power output transformer 900's primary windings 904. The pair of power output signals $3_1$ and $3_2$ is fed to a third winding of the power output transformer 900's primary windings 904.

Secondary windings 906 on the other side of the transformer and filter 900 present multi-phase, sinusoidal, Y-connected power output signals 908 which are labeled A, B, C, and N for neutral. These power output signals present multi-phase, 400-Hz power whenever the module 20 is in operation. The voltage presented varies depending upon the output voltage which the electric power converter module 20 is called upon to produce. The control system 410 measures the voltages presented by the signals A. B, and C, and these voltage measurements 442 are fed into the control system 410 as part of the voltage and current measurements 440. When the module 20 is called upon to generate 115 volts 400 Hz A.C. power, the control system 410 commands the sine wave synthesizer 700 to produce waveforms on the signal lines $1_1$, $1_2$, $2_1$, $2_2$, $3_1$, and $3_2$ adjusted in pulse width to maintain the sinusoidal voltages presented by the signals A, B, and C (measured at 442) at 115 volts (RMS) independent of the load. However, the system shuts down if the current and power drain is excessive (power is voltage multiplied by current). Different current and power limits may be established for different airplanes. The control system 410 closes the switch 406 and presents the power signals A, B, and C at the 115 volt 400 Hz A.C. power output 407 which are connected to the airplane by suitable cables. The voltage measurement 442 is a measurement of the voltage at the power output 407 when the switch 406 is closed.

When the power converter module 20 is called upon to generate 270 volts D.C. for an airplane requiring power converted in this manner, the control system 410 opens the switch 406 and closes the switch 408 so that the signals A, B, and C are fed through and rectified by the 270 volt D.C. rectifier 1000 and are presented at the 270 volt D.C. power output 409 which are connected to the airplane by suitable cables. The control system 410 ignores the voltage of the signals A, B, and C and measures instead the D.C. output current I (current measurement 448) and voltage $V_2+$ (voltage measurement 446) both of which are measured at the positive terminal of the D.C. power output 409 (in FIG. 4) and adjusts the pulse widths generated by the sine wave synthesizer 700 to produce waveforms on the signal lines $1_1$, $1_2$, $2_1$, $2_2$, $3_1$, and $3_2$ adjusted in pulse width to hold the D.C. output voltage stable at 270 volts, provided the current and power drain is not excessive. Different current and power limits may be established for different airplanes.

As was just explained, the signals 908 (A, B, and C) are routed (in FIG. 4) to a first A.C. output switch 406 and to a second D.C. output switch 408. The signals 908 (A, B, and C) are also connected to a set of smoothing capacitors 434, 436, and 438 (shown in FIG. 4) which further suppress any remaining harmonics of 400 cycles.

Figure 10:
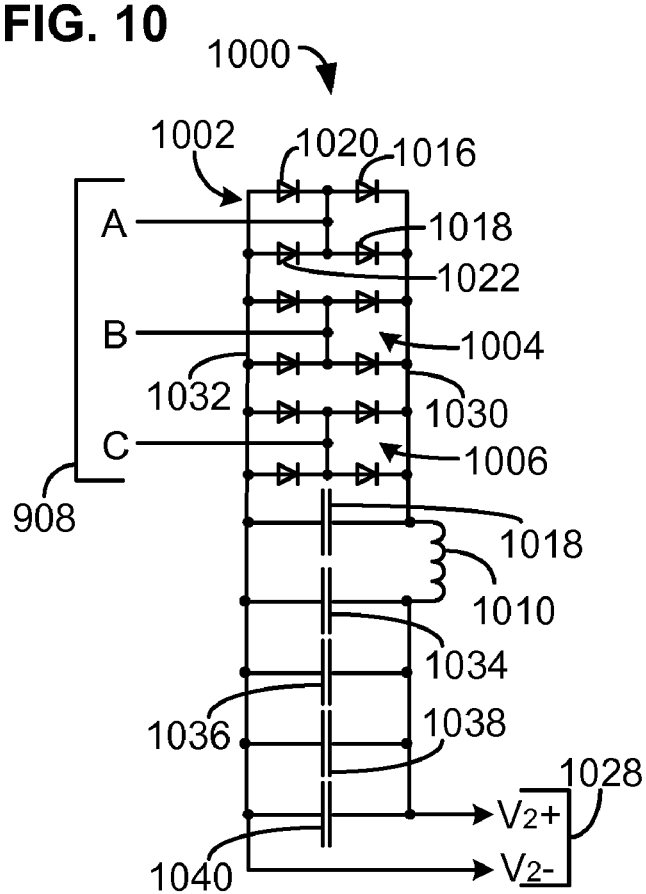
FIG. 10 is a circuit diagram of one embodiment of a 270 V DC rectifier used in FIG. 4.

Referring now to FIG. 10, the second rectifier 1000 is shown. The rectifier 1000 rectifies the 400 Hz power signals A, B, and C 908 whenever the D.C. power switch 408 is closed. When 270 volts D.C. is being generated, the voltages presented by the power signals A, B, and C are adjusted up or down to maintain the 270 volt D.C. power output 409 (FIG. 4) at 270 volts D.C. FIG. 10 shows that each of the three power signals A, B, and C (shown at 908) is connected to a respective set of four rectifier diodes 1002, 1004, and 1006. Each set 1002, 1004, and 1006 of four diodes, for example the illustrative set of four diodes 1016, 1018, 1020, and 1022, includes two pairs of diodes 1016-1018 and 1020-1022 connected in parallel. The anodes of the two parallel-connected diodes 1016-1018 connect to the power signal A, and the cathodes of these two diodes connect to a D.C. positive output line 1030. The cathodes of the two parallel-connected diodes 1020-1022 connect to the power signal A, and the anodes of these two diodes connect to a D.C. negative output line 1032. The remaining two four-diode sets 1004 and 1006, likewise, respectively connect the incoming power lines B and C to the positive and negative output lines 1030 and 1032. The output lines 1030 and 1032 are coupled to a first filter capacitor 1008. The circuit arrangement just described causes the diode sets 1002, 1004, and 1006 to develop across the filter capacitor 1008 a D.C. voltage that approximately equals the instantaneous voltage difference between the most positive and the most negative voltage swings of the three power signals A, B, and C, in signal peak detector rectifier fashion.

D.C. current flows from capacitor 1008 through a filter inductor 1010 and into a bank of four 4700uf, 400 volt filter capacitors 1034, 1026, 1038, and 1040. The DC voltage developed across this bank of filter capacitors is presented as the 270 volt filtered D.C. output voltage $V_2+$ and $V_2-$ at 1028.

Figure 11:
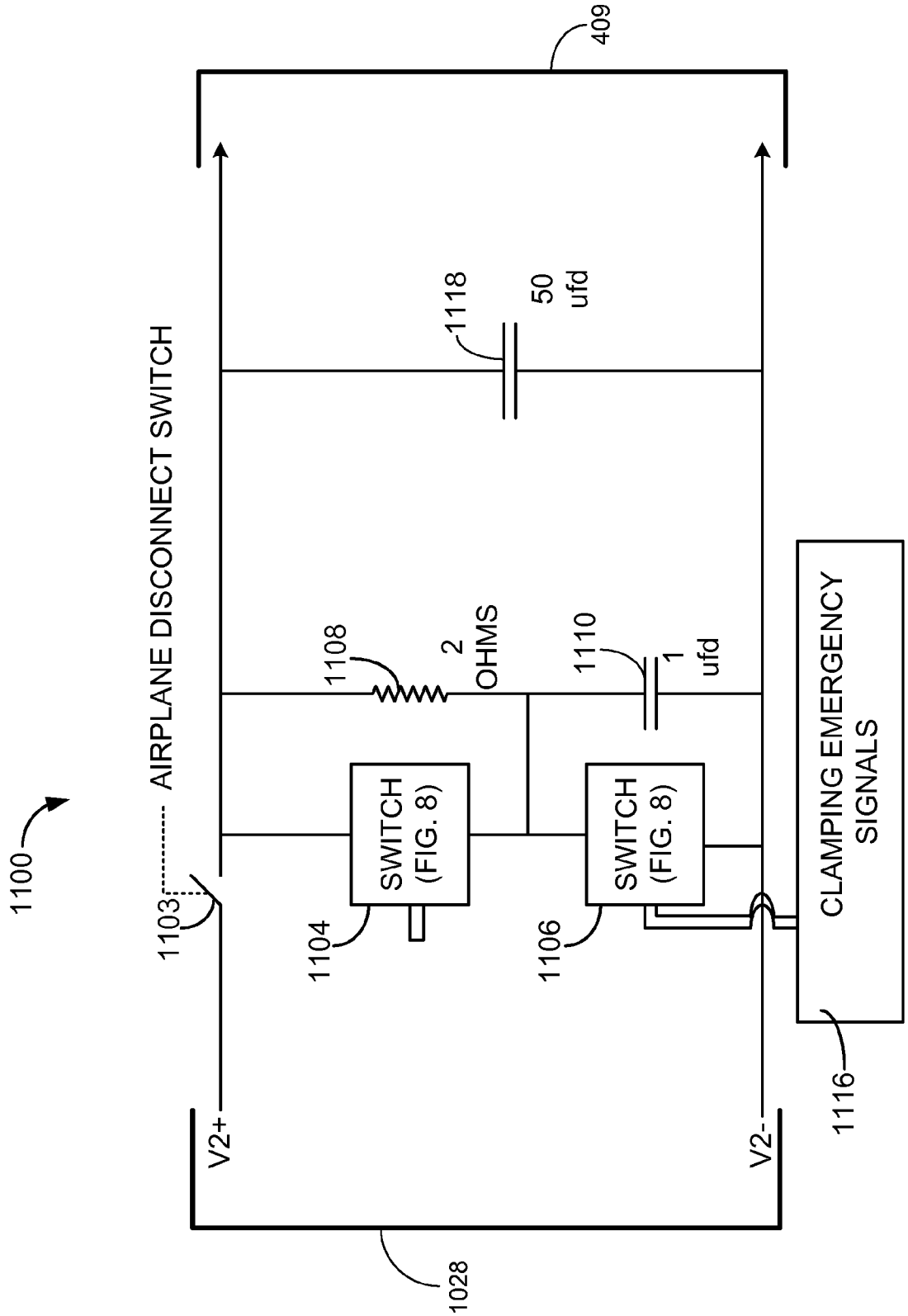
FIG. 11 is a circuit diagram of one embodiment of an output clamp switch used in FIG. 4.

Referring now to FIG. 11, the clamp circuit 1100 is shown. This clamp circuit 1100 includes a voltage-spike-capturing capacitor 1118 and an electronic clamp circuit 1104-1106 which is connected directly across the 270 volt D.C. power output 409 of the electrical power conditioning module 20 (shown in FIG. 4). This clamp circuit is connected in series with the airplane disconnect switch 1103 (a relay controlled by the control system 410) across the 270 volt D.C. power signals V2+ and V2– 1028 which flow from the rectifier 1000 (shown in FIG. 10). The capacitor 1110 protects the electronic clamp circuits from sudden transient voltage rises that might exceed the breakdown voltages of the switches 1104, 1106, 1112, and 1114. The two clamp circuits 1104-1106 and 1112-1114 short out surge currents caused by arcing or inductive arc back or other sources of electrical transients that might feed back from an airplane. When the switch 1103 disconnects the D.C. power supply entirely from the airplane, the clamp circuit 1100 prevents arcing of the relay contact points of the switch 1103 and dissipates any charge that may be stored on the DC buss attached to the converter. In some circumstances it is possible for the airplane to feed power back towards the converter. During such events, the clamping circuit 1100 dissipates such power and prevents arcing across the switch 1103 and damage to the power supply while the feedback event is ongoing.

The clamp circuit 1100 contains a serially-connected pair of electronic switches 1104-1106. These switches are of the type shown in FIG. 8.

The pair of switches 1104-1106 includes a first switch 1106 and a second switch 1104 connected with the source and gate of the second switch 1104 connected to the drain of the first switch 1106 as shown (FIGS. 8 and 11). The source and drain of the first switch 1106 are connected in parallel with a capacitor 1110. The source and gate of the first switch 1106 are connected to the control system 410 by clamping emergency signals 1116. The source and drain of the second switch 1104 are connected in parallel with a resister 1108. This arrangement makes it possible for the two switches to withstand the high voltages that can arise at this point in the circuit.

With reference to FIG. 4, to enable the control system 410 to provide all the control signals described above, the control system must receive measurements of voltage "V" and of current "I" at both the 115 volt 400 Hz A.C. power signal output 407 and at the 270 volt D.C. power output 409. As can be seen in FIG. 4, both voltage and current are measured at the D.C. power output 409. The 400 Hz. A.C. voltages are measured at the signals A, B, and C, and the 400 Hz. A. C. current is measured using Hall effect current sensors at the signals $1_2$, $2_2$, and $3_2$. These voltage and current measurements are fed into the control system 410, and the control system 410 analyzes the appropriate ones of these voltages and currents and then makes the necessary corrections in the width of the pulses that comprise the switching control signals 708 to either stabilize the 400 Hz. A.C. voltage at 115 volts or to stabilize the D.C. voltage at 270 volts, whichever type of power is currently being fed to an airplane.

Referring now to FIG. 12, a block diagram of the signal interaction between the various modules of the ground support equipment cart 10 is illustrated. The display 24 and a universal control and diagnostic processor 1206 are part of the control module 22. The display 24 normally displays to the user the main menu that is shown in FIG. 13. This main menu permits the user to configure all the modules on the cart 10 for a particular type or class of airplane by simply depressing one of the push buttons 1202 or 1204 that designates the type or class of airplane that is to be serviced. Once an airplane type or class is designated, the universal control and diagnostic processor 1206 sends control signals to a network bus driver 1210 and over a CAN bus 1212 to the various modules 14, 20, 400, and 1208 that are mounted upon the ground support equipment cart 10. The various modules 14, 20, 400, and 1208 are configured by these signals so that all the modules can be used safely with the user-selected type or class of airplane. In the case of the power converter module 20, the control signals cause the control system 410 to: close the switch 406 if the airplane requires 115 volt, 400 Hz power; close the switch 408 if the airplane requires 270 volt D.C. power; or open both the switches 406 and 408 if the airplane requires 28 volts D.C. power—in which case the control signals turn on the 240 volt D.C. power converter module 1208 if it is present on the cart 10.

Referring now to FIG. 13, the main menu of the display 24 is shown. The display 24 allows a user to designate a specific type or class of airplane, in which case all of the modules are automatically configured properly for that particular type or class of airplane. The user may also select some other option, such as "Maintenance." If the user selects the "Maintenance" option, then the maintenance menu shown in FIG. 14 is displayed. One of the options on this maintenance menu is "270 Volt Maintenance," which leads to one or more screens that report the status of the power conversion module 20—such things as voltage, current, and power generated, state (115 volt 400 Hz A.C., 270 volt D.C., or standby), and history log. Service personnel with the proper passwords may be permitted to alter various characteristics, such as the voltage level and the alarming and shut-down current and power levels.

While an embodiment of the invention has been disclosed, those skilled in the art will recognize that numerous modifications and changes may be made without departing from the true spirit and scope of the claims as defined by the claims annexed to and forming a part of this specification.

What is claimed is:

1. A multi-voltage A.C. and D.C. power supply comprising:
    a power supply module having an A.C. power input, at least one A.C. power output, at least one D.C. power output, and having an incoming power output selection signal;
    a sine wave synthesizer within said module having a D.C. power input, a synthesized A.C. power output, and having as input one or more sine wave synthesizing control signals;
    a first connection between the module's A.C. power input and the synthesizer's D.C. power input, said first connection comprising a first rectifier;
    a second connection between the synthesizer's A.C. power output and the module's A.C. power output;
    a third connection between the synthesizer's A.C. power output and the module's D.C. power output, said third connection comprising a second rectifier; and
    a control system receiving measurements of voltages at the module's A.C. and D.C. power outputs and also receiving the module's A.C. or D.C. power output selection signal, the control system generating the sine wave synthesizing control signals and adjusting them to regulate whichever output signal, A.C. or D.C., is selected by the selection signal so that selected output signal is maintained at a predetermined A.C. or D.C. preset voltage level.

2. A multi-voltage A.C. and D.C. power supply in accordance with claim 1 wherein:
    the second connection between the synthesized A.C. power output and the module's A.C. power output comprises a first switch controlled by a first switch closure signal;
    the third connection between the synthesized A.C. power output and the module's D.C. power output comprises the second rectifier connected in series with a second switch controlled by a second switch closure signal; and
    the control system generates the first switch closure signal when A.C. power is selected by the selection signal and generates the second switch closure signal when D.C. power is selected.

3. A multi-voltage A.C. and D.C. power supply in accordance with claim 1 wherein:
    the first connection between the module's A.C. power input to the synthesizer's D.C. power input comprises a 3-phase transformer having delta and Y outputs connected in series with the first rectifier such that the first rectifier rectifies the delta and the Y power signals.

4. A multi-voltage A.C. and D.C. power supply in accordance with claim 1 wherein the sine wave synthesizer A.C. output generates a multi-phase, 400 Hz switching signal that is filtered by passage through a multi-phase transformer having capacitors connected across its output terminals.

5. A multi-voltage A.C. and D.C. power supply in accordance with claim 1 wherein a clamp circuit controlled by a clamping signal is connected across at least one of the module's power outputs, the control system generating the clamping signal in response to measurements of reverse power flow into that power output.

6. A multi-voltage A.C. and D.C. power supply in accordance with claim 1 wherein a disconnect circuit controlled by a disconnect signal is connected in series with one of the connections to at least one of the module's power outputs, the control system generating the disconnect signal in response to measurements of improper power flow at that power output.

7. A multi-voltage A.C. and D.C. power supply in accordance with claim 1 wherein the sine wave synthesizer A.C. output is 400 Hz at or near 115 volts when the selection signal calls for that type of power.

8. A multi-voltage A.C. and D.C. power supply in accordance with claim 1 wherein the D.C. output is maintained at or near 270 volts when the selection signal calls for that type of power.

9. A multi-voltage A.C. and D.C. power supply in accordance with claim 1 wherein the D.C. output is maintained at or near 28 volts when the selection signal calls for that type of power.

10. An airplane ground support system including multi-voltage A.C. and D.C. power supply comprising:
    an air conditioning module;
    a control module having a display and a processor, the display and processor presenting an airplane type or class selection menu to airplane support technicians and responding to the selection of a type or class of airplane by generating a power output selection signal designating the type of power needed by the selected type or class of airplane;
    a power supply module having an A.C. power input, at least one A.C. power output, at least one D.C. power output, and having as an incoming signal the power output selection signal;
    a sine wave synthesizer within said power supply module having a D.C. power input, a synthesized A.C. power output, and having as input one or more sine wave synthesizing control signals;

a first connection between the power supply module's A.C. power input and the synthesizer's D.C. power input, said first connection comprising a first rectifier;

a second connection between the synthesizer's A.C. power output and the power supply module's A.C. power output;

a third connection between the synthesizer's A.C. power output and the power supply module's D.C. power output, said third connection comprising a second rectifier; and a control system receiving measurements of voltages at the power supply module's A.C. and D.C. power outputs and also receiving the control module's power output selection signal, the control system generating the sine wave synthesizing control signals and adjusting them to regulate whichever output signal, A.C. or D.C., is selected by the selection signal so that selected output signal is maintained at a predetermined A.C. or D.C. preset voltage level.

11. An airplane ground support system in accordance with claim 10 wherein the selected output signal is maintained at a predetermined preset voltage level as mandated by the power output selection signal.

12. An airplane ground support system in accordance with claim 10 wherein:

the second connection between the synthesized A.C. power output and the power supply module's A.C. power output comprises a first switch controlled by a first switch closure signal;

the third connection between the synthesized A.C. power output and the power supply module's D.C. power output comprises the second rectifier connected in series with a second switch controlled by a second switch closure signal; and the control system generates the first switch closure signal when A.C. power is selected by the selection signal and generates the second switch closure signal when D.C. power is selected.

13. An airplane ground support system in accordance with claim 11 wherein:

the first connection between the power supply module's A.C. power input to the synthesizer's D.C. power input comprises a 3-phase transformer having delta and Y outputs connected in series with the first rectifier such that the first rectifier rectifies the delta and the Y power signals.

14. An airplane ground support system in accordance with claim 11 wherein the sine wave synthesizer A.C. output generates a multi-phase, 400 Hz switching signal that is filtered by passage through a multi-phase transformer having capacitors connected across its output terminals.

15. An airplane ground support system in accordance with claim 11 wherein a clamp circuit controlled by a clamping signal is connected across at least one of the power supply module's power outputs, the control system generating the clamping signal in response to measurements of reverse power flow into that power output.

16. An airplane ground support system in accordance with claim 11 wherein a disconnect circuit controlled by a disconnect signal is connected in series with one of the connections to at least one of the power supply module's power outputs, the control system generating the disconnect signal in response to measurements of improper power flow at that power output.

17. An airplane ground support system in accordance with claim 11 wherein the sine wave synthesizer A.C. output is 400 Hz at or near 115 volts when the selection signal calls for that type of power.

18. An airplane ground support system in accordance with claim 11 wherein the D.C. output is maintained at or near 270 volts when the selection signal calls for that type of power.

19. An airplane ground support system in accordance with claim 11 wherein the D.C. output is maintained at or near 28 volts when the selection signal calls for that type of power.

20. An airplane ground support system including multi-voltage A.C. and D.C. power supply comprising:

an air conditioning module;

a control module having a display and a processor, the display and processor presenting an airplane type or class selection menu to airplane support technicians and responding to the selection of a type or class of airplane by generating a power output selection signal designating the type of power needed by the selected type or class of airplane;

a power supply module having an A.C. power input, at least one of an A.C. power output and a D.C. power output, and having as an incoming signal the power output selection signal;

a sine wave synthesizer within said power supply module having a D.C. power input, a synthesized A.C. power output, and having as input one or more sine wave synthesizing control signals;

a first connection between the power supply module's A.C. power input and the synthesizer's D.C. power input, said first connection comprising a first rectifier;

a second connection between the synthesizer's A.C. power output and the power supply module's A.C. power output;

a third connection between the synthesizer's A.C. power output and the power supply module's D.C. power output, said third connection comprising a second rectifier; and a control system receiving measurements of voltages at the power supply module's power output and also receiving the control module's power output selection signal, the control system regulating the output signal selected by the selection signal so that selected output signal is maintained at a predetermined preset voltage level as mandated by the power output selection signal.

* * * * *